C. E. LANGLEY.
CLOTHESLINE POLE.
APPLICATION FILED JULY 11, 1919.

1,321,761.

Patented Nov. 11, 1919.

WITNESS:
R. A. Thomas

INVENTOR.
C. E. Langley
BY
Victor J. Evans
ATTORNEY.

UNITED STATES PATENT OFFICE.

CHARLES E. LANGLEY, OF KEOKUK, IOWA.

CLOTHESLINE-POLE.

1,321,761.    Specification of Letters Patent.    Patented Nov. 11, 1919.

Application filed July 11, 1919. Serial No. 310,027.

*To all whom it may concern:*

Be it known that I, CHARLES E. LANGLEY, a citizen of the United States, residing at Keokuk, in the county of Lee and State of Iowa, have invented new and useful Improvements in Clothesline-Poles, of which the following is a specification.

The object of my present invention is the provision of a pole for supporting a clothes-line, and one that is adapted to be expeditiously and easily engaged or interlocked with a clothes-line without liability of the line being casually released from the pole while in use.

Other objects and practical advantages of the invention will be fully understood from the following description and claim, when the same are read in connection with the drawings, accompanying and forming part of this specification, in which:

Similar numerals designate corresponding parts in Figs. 1 to 3, to which reference will first be had.

Figure 1:
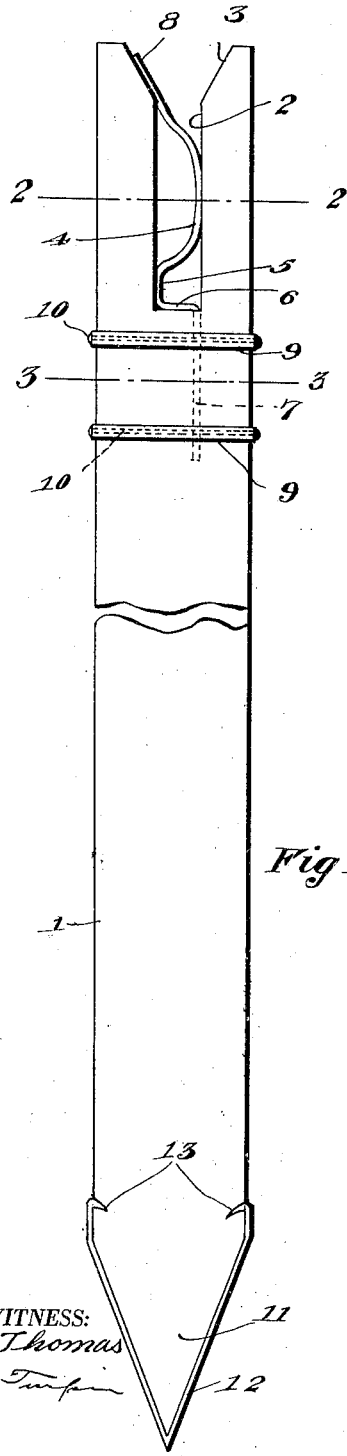
Figure 1 is a broken elevation of the pole constituting the best practical embodiment of my invention that I have as yet devised.
Figure 2:
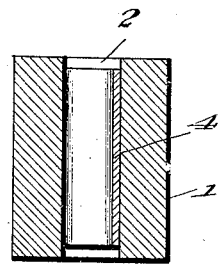
Fig. 2 is a transverse section taken in the plane indicated by the line 2—2 of Fig. 1, looking downwardly.
Figure 3:
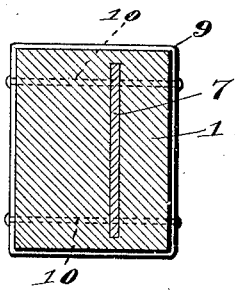
Fig. 3 is a similar view on the line 3—3 of Fig. 1.

The pole 1 is of wood, and is provided in its upper end portion with a diametrical bifurcation 2, the mouth of which is flared, as indicated by 3, to facilitate the entrance of a clothes-line.

Disposed in the bifurcation 2 is an upright bowed-spring 4 which merges at its lower end into a loop 5, the bight of which bears against one side wall of the bifurcation as illustrated, The said loop 5 merges, in turn, into an arm 6 that bears firmly on the inner end wall of the bifurcation 2, and from the said arm 6 depends a terminal 7 that is embedded in the wood of the pole and is arranged in a plane immediately adjacent that of the opposite side wall of the bifurcation so that the arm 6 is utilized, in the bracing of the bowed-keeper-spring in the bifurcation. At its upper end the bowed spring 4 is provided with a terminal portion 8 which extends in the same general direction and normally rests close to one wall of the flared mouth 3, so as to facilitate rather than interfere with the placing of a line in the bifurcation and in engagement with the keeper-spring.

The depending portion 7 of the keeper-spring may be secured in the pole by any suitable means, as by bands 9 that encircle the pole and said terminal portion. I do not desire, however, to be understood as confining myself to the said bands. I would also have it understood that rivets 10 may, when deemed necessary, be employed at points illustrated with a view to preventing splitting of the pole.

In the embodiment shown in Fig. 1, the pole 1 is provided with a pointed lower end 11 that is sheathed with a U-shaped metallic shoe 12, the said shoe 12 having flanges 13 at its upper end embedded in the pole, whereby the shoe is strongly connected of itself to the pole.

Figure 4:
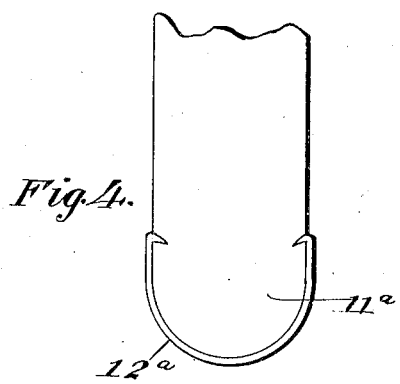
Fig. 4 is a detail view showing a modified lower end portion of the pole.

In the embodiment shown in Fig. 4, the lower end, 11$^a$ of the pole, is blunt and is shod and protected through the medium of a curvilinear or concavo-convex shoe 12$^a$.

It will be apparent from the foregoing that my novel pole is adapted to be quickly and easily engaged with a clothes-line, and that when the line has passed the bowed spring 4 and is seated in the bifurcation 2 between said spring and the arm 6 of the keeper-member, there is no liability whatever of the line being accidentally released from the pole. When, however, the clothes-line is crowded outwardly past the spring 4, the spring will give and permit the passage of the line and will then immediately resume its normal position. It will also be apparent that the pole equipped as described is simple and inexpensive in construction and at the same time is well adapted to withstand the usage to which clothes-line poles are ordinarily subjected.

Having described my invention, what I claim and desire to secure by Letters-Patent, is:

The combination with a clothes-line pole bifurcated at its upper end and having a flared mouth in communication with the bifurcation, of a bowed-spring located lengthwise in the bifurcation and terminating at its upper end in a portion that normally lies close to one wall of the flared mouth, and terminating at its lower end in a loop the bight of which rests against one side wall of the bifurcation, said loop being merged into an arm that bears on the inner end wall of the bifurcation, and said arm, in turn, being merged into a depending portion embedded in the pole.

In testimony whereof I affix my signature.

CHARLES E. LANGLEY.